Patented May 22, 1951

2,553,771

UNITED STATES PATENT OFFICE 2,553,771

METHOD OF PREPARING N-TRICHLORO-METHYLTHIOIMIDES

Allen R. Kittleson, Cranford, and Howard L. Yowell, Westfield, N. J., assignors to Standard Oil Development Company, a corporation of Delaware No Drawing. Application September 23, 1948, Serial No. 50,888

12 Claims. (Cl. 260—313)

This invention relates to new and useful improvements in the preparation of new chemical compounds, N-trichloromethylthio imides and more particularly of improved methods for the preparation of N-trichloromethylthio imides derived from dicarboxylic acids.

There was disclosed in U. S. application No. 773,925, now abandoned, as new compounds, N-trichloromethylthio imides, corresponding to the general formula

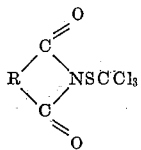

wherein R is a hydrocarbon nucleus.

These compounds were disclosed to be effective parasiticides and especially active fungicides. The preferred method of preparing these compounds was the reaction of the metal salt of an imide with perchloromethyl mercaptan (ClSCCl$_3$) in an organic solvent as indicated below, where M represents a metal.

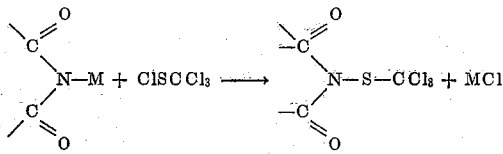

The preparation disclosed in application No. 773,925 involves first the formation of a metal salt of the desired imide in alcohol solution followed by precipitation and drying. The salt is then dispersed in benzene or dioxane and while stirring and heating to 50–80° C. an equal molecular quantity of perchloromethyl mercaptan is added over a period of 1–2 hours. The reaction is continued for 3 to 4 hours after all the mercaptan has been added. After cooling, the reaction mixture is filtered, giving a crystalline residue which consists of a mixture of occluded metal halide, unreacted salt imide, and the N-trichloromethylthio imide. This residual mixture is purified by drying, is then dispersed in dilute alkali to remove the unreacted imide salt, filtered, washed with water to remove the metal halide, and then dried. To recover the product remaining dissolved in the reaction medium, it is necessary to reduce the organic liquid to a small volume by distillation, cool it, and filter off the precipitate.

It is apparent from the above description that the procedure involves a variety of manipulations which tend to reduce the yield of final product as well as cost of solvent recovery with attending solvent losses.

It has now been found that the preparation of N-trichloromethylthio imides can be greatly simplified and the yield of pure product increased by dissolving the desired imide, without first forming the metal salt, in aqueous alkaline solution followed by addition of an equal molecular quantity of perchloromethyl mercaptan. The mixture is stirred rapidly, until the aqueous medium becomes acid to litmus then filtered and air dried. An 85–93% yield of N-trichloromethylthio imide of high purity is thus obtained. The reaction may be carried out at room temperature. In cases where the imide is readily hydrolyzed in alkaline solution it may be advantageous to cool the reaction mixture as low as 0° C.

The metal compound used to supply the necessary alkaline solution is a compound of an alkali metal which make up family A of group I of the periodic table, i. e. lithium, sodium and potassium and the like. Because of cost factors, sodium and potassium are preferred. The alkali is present preferably in amounts equivalent to the imide used. While other basic compounds may be used, it is desirable to use the hydroxides because of the consequent avoidance of the presence of other radicals which might have to be removed.

While usually it is preferable to add the perchloromethyl mercaptan to the reaction mixture until the former is present in excess as indicated by an acidic reaction, under certain circumstances it is desirable to have the imide and alkali metal compound in excess. Under these latter conditions the addition of perchloromethyl mercaptan to the reaction mixture is discontinued before an acidic reaction is obtained. Some alkali metal imide salt would consequently appear dissolved in the resulting filtrate. The filtrate containing dissolved alkali metal imide salt can then advantageously be returned to the reaction zone for further conversion to the N-trichloromethylthio imide.

This invention will be better understood by reference to the following examples of the preparation of the compounds of this invention:

Example I.—N-trichloromethylthio-tetrahydrophthalimide

A. Four mols (604 g.) of tetrahydrophthalimide 2500 cc. of water and 160 g. of sodium hydroxide were charged to a 5 liter flask equipped with a thermometer, stirrer and dropping funnel. After all the imide had dissolved 744 g. of perchloromethyl mercaptan was added slowly from the dropping funnel. The mercaptan addition required two hours. Rapid agitation was maintained during the addition and for 1½ hours thereafter. The temperature of reaction was maintained at 10–15° C. during this entire period. The reaction mixture was filtered, washed with water followed by methyl alcohol wash to remove a small amount of unreacted perchloromethyl mercaptan. After air drying 1035 g. (86% yield) of a white powder was recovered having a melting point of 171° C. Analysis of the product gave the following results:

|  | Per Cent Cl | Per Cent S | Per Cent N | Per Cent C | Per Cent H |
|---|---|---|---|---|---|
| Found | 34.85 | 10.67 | 4.58 | 36.11 | 3.12 |
| Theory for— 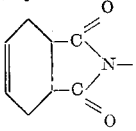 | 35.50 | 10.67 | 4.67 | 36.00 | 2.66 |

B. 4,530 g. of tetrahydrophthalimide was dispersed in 12 liters of ice and water in a 15 gal. steel drum equipped with two high speed stirrers. 1240 g. of NaOH dissolved in 12 liters of water was then added. After solution was complete 5,500 g. of perchloromethyl mercaptan was added over a period of about twelve minutes. The temperature of the reaction mixture at the start was 6° C. and was maintained below 14° C. by the addition of ice. Very rapid agitation was maintained during the addition of perchloromethyl mercaptan and for 3½ hours thereafter at which point the reaction mixture became acid to litmus. The mixture was then filtered, washed with water followed by a small quantity of methyl alcohol. Recovered 7,840 g. (87.1% yield) of white solid M. P. 170–171° C.

*Example 2.—Preparation of N-trichloromethyl-thio phthalimide*

147 g. of phthalimide (practical) and 400 cc. of isopropyl alcohol were charged to a 2-liter flask equipped with a stirrer, dropping funnel and thermometer. 400 cc. of ice and water containing 40 g. of NaOH were added and the mixture stirred until solution of the phthalimide was complete. Approximately 15 minutes was required for this step. With the temperature of the reaction mixture at 4° C., 186 g. of perchloromethyl mercaptan was added from the dropping funnel over a period of 5 minutes. Rapid stirring was maintained during the addition. The temperature of the reaction mixture increased rapidly to 24° C. then slowly decreased. The reaction solution became acid to litmus in less than one minute after all of the perchloromethyl mercaptan had been added. Stirring was continued for an additional five minutes after which the product was filtered, the residue washed with water and air dried. Recovered 237 g. of a white powder, the crude product having a melting point of 165–170° C. Analysis showed 9.50% sulfur and 37.3% chlorine.

*Example 3.—Preparation of N-trichloromethyl-thio succinimide*

99 g. of succinimide and 250 cc. of ice water were charged to a 1-liter flask equipped as in Example 1. 250 cc. of ice water containing 40 g. of NaOH was added and the mixture stirred until solution was complete. 186 g. of perchloromethyl mercaptan was added from the dropping funnel over a period of 5 minutes at which time the aqueous solution became acid to litmus. The reaction mixture was filtered with suction, washed with water and air dried. Recovered 173 g. of a white powder having a melting point of 139–141° C. The melting point of purified N-trichloromethylthio succinimide is 141° C.

Perchloromethyl mercaptan is not soluble in aqueous solutions so that a solubilizer such as isopropyl alcohol may advantageously be added.

While examples of the preparation of aliphatic, alicyclic and aromatic imides have been listed it is readily apparent that various substituted derivatives may also be prepared by the method of this invention.

One of the advantages of the process in this invention is that it is unnecessary to first prepare and purify the costly metal imide salt.

Another advantage resides in the use of an aqueous reaction media instead of a more costly organic reaction media.

Still another advantage resides in the fact that any unreacted metal imide can be returned to the reaction zone, thereby permitting a continuous type of operation.

Yields of 85% and higher have been obtained by the process of this invention as compared to yields of 70 to 75% obtained by the process of the prior art discussed above.

This invention has been described with respect to specific embodiment but it is not intended to be limited thereby.

What is claimed is:

1. A method for preparing N-trichloromethylthio imide compounds corresponding to the formula

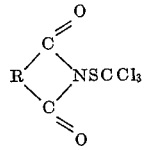

wherein R is a hydrocarbon nucleus, which comprises dissolving an imide of a dicarboxylic acid in an aqueous alkaline solution of an alkali metal compound and reacting the resulting product with perchloromethyl mercaptan.

2. A method as in claim 1 in which the alkali metal compound is present in the solution in an amount at least equivalent to the imide.

3. A process for preparing N-trichloromethylthio imide compounds corresponding to the formula

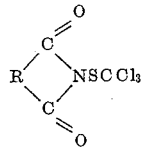

wherein R is a hydrocarbon nucleus, which comprises dissolving an imide of a dicarboxylic acid in an aqueous alkali metal hydroxide solution, said alkali hydroxide being present in the solution in an amount at least equivalent to the imide and reacting the resulting product with perchloromethyl mercaptan.

4. A process as in claim 3 in which the alkali hydroxide is sodium hydroxide.

5. A process as in claim 4 in which the N-trichloromethylthio imide is N-trichloromethylthio-tetrahydrophthalimide.

6. A process as in claim 4 in which the N-trichloromethylthio imide is N-trichloromethylthio-phthalimide.

7. A process as in claim 4 in which the N-trichloromethylthio imide is N-trichloromethylthio-succinimide.

8. A method for preparing N-trichloromethylthio imide compounds corresponding to the formula

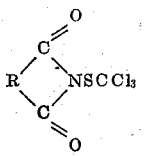

wherein R is a hydrocarbon nucleus, which comprises dissolving an imide of a dicarboxylic acid in an aqueous alkaline alcohol solution of an alkali metal compound and reacting the resulting product with perchloromethyl mercaptan.

9. A method for preparing N-trichloromethylthio imide compounds corresponding to the formula

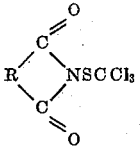

wherein R is a hydrocarbon nucleus, which comprises the steps of dissolving an imide of a dicarboxylic acid in an aqueous alkaline solution of an alkali metal compound; reacting the resulting product with perchloromethyl mercaptan to precipitate the N-trichloromethylthio imide; filtering off the N-trichloromethylthio imide and recycling a resulting filtrate containing dissolved alkali metal imide to the reaction step.

10. A process for the preparation of an N-trichloromethylthio imide which comprises the steps of dissolving an imide in an aqueous alkaline solution of an alkali metal compound and reacting the resulting product dissolved in the aqueous media with admixed perchloromethyl mercaptan.

11. A process for the preparation of an N-trichloromethylthio imide which comprises dissolving an organic compound having an NH group linked to an acyl group in an aqueous alkaline solution of an alkali metal compound and reacting the resulting product with perchloromethyl mercaptan, whereby the NH group linked to the acyl group reacts with the perchloromethyl mercaptan.

12. A process for the preparation of an N-trichloromethylthio imide which comprises dissolving an imide having a single reactive NH group in an aqueous alkaline solution of an alkali metal compound and reacting the resulting product with perchloromethyl mercaptan, whereby the reactive NH group reacts with the perchloromethyl mercaptan.

ALLEN R. KITTLESON.
HOWARD L. YOWELL.

No references cited.